May 22, 1962 R. T. HECKER 3,035,728
VEHICLE TRANSPORT
Filed Dec. 15, 1959 2 Sheets-Sheet 1
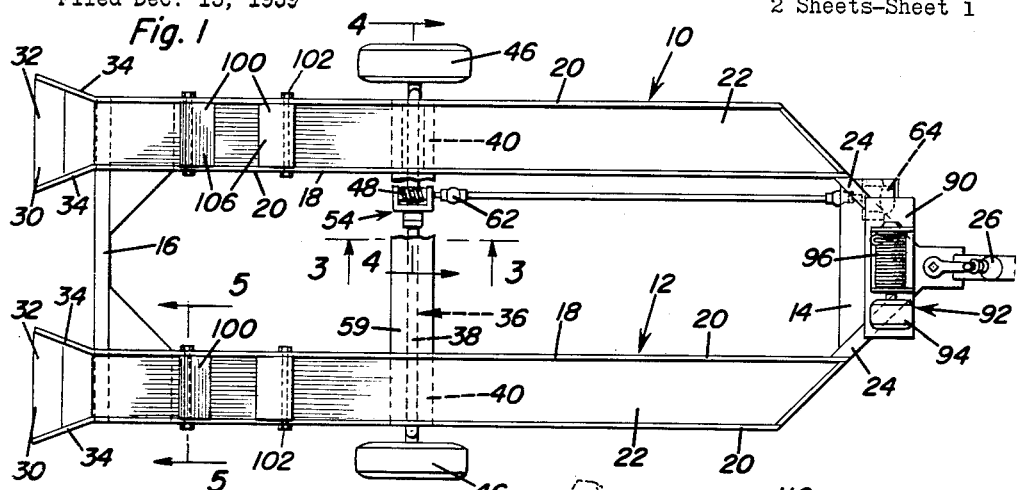
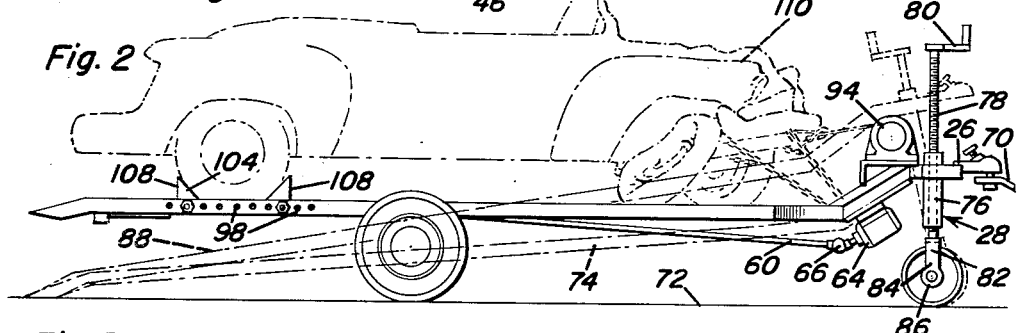
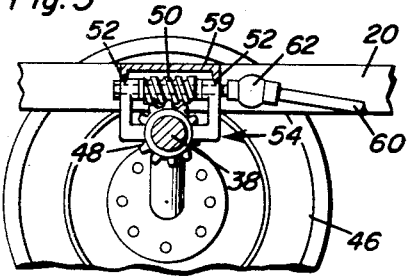
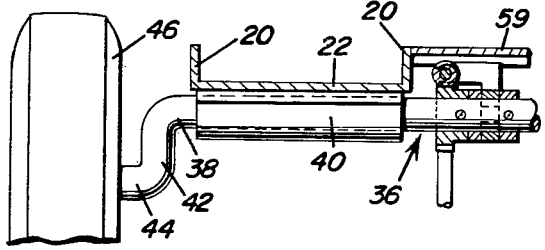
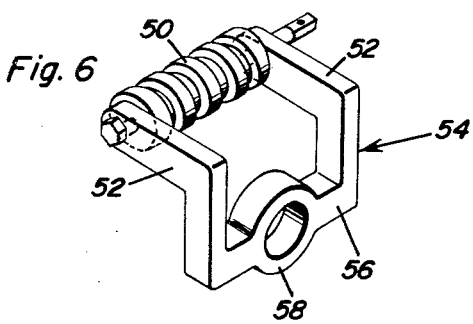
Robert T. Hecker INVENTOR.
BY *Clarence A. O'Brien*
*and Harvey B. Jacobson*
Attorneys

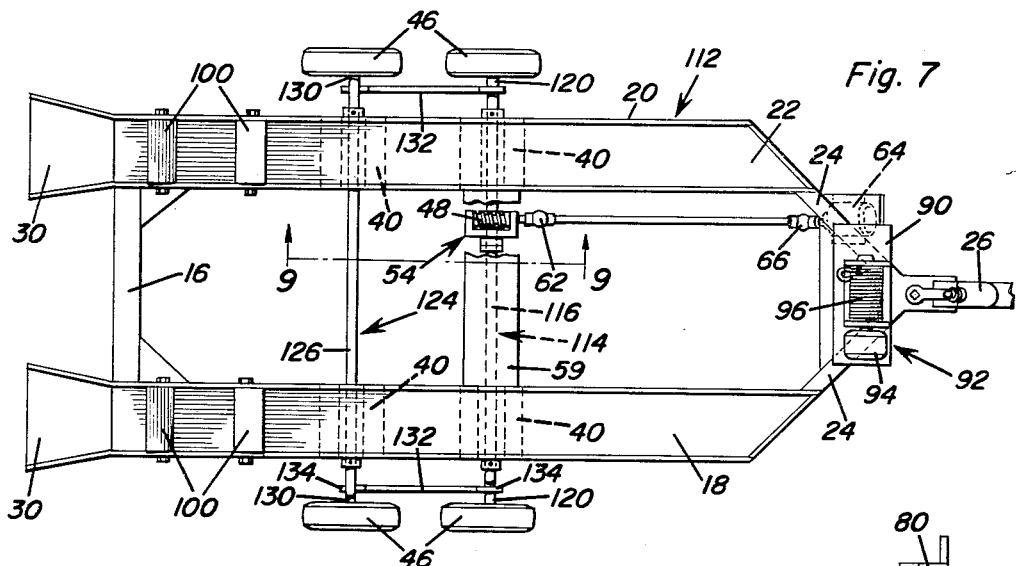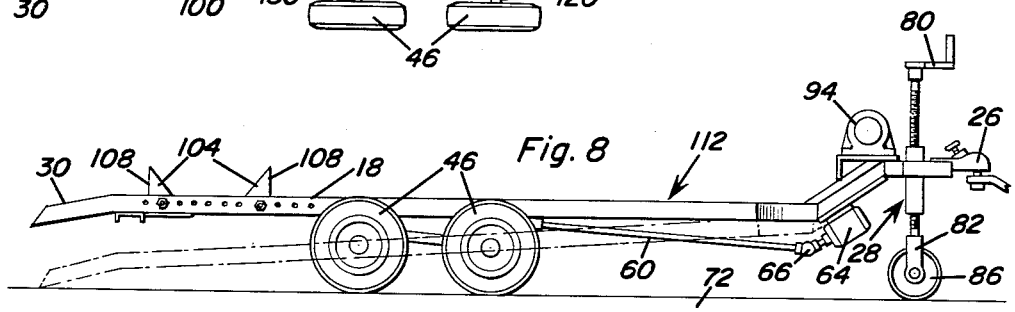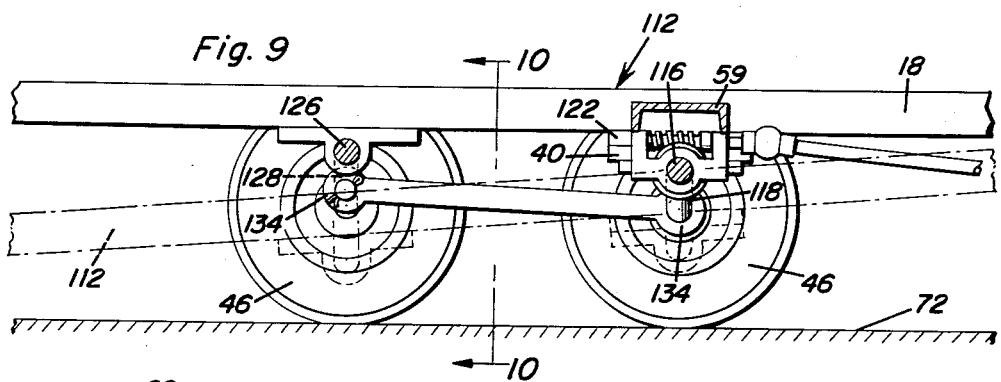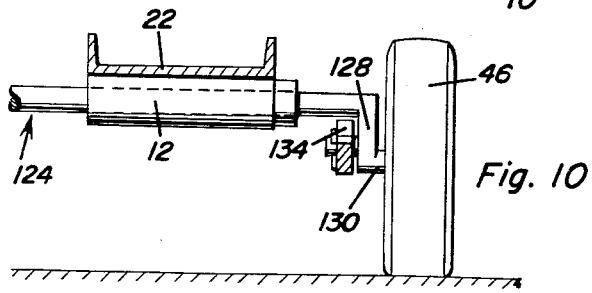

United States Patent Office 3,035,728
Patented May 22, 1962

3,035,728
VEHICLE TRANSPORT
Robert T. Hecker, R.F.D. 2, Duncansville, Pa.
Filed Dec. 15, 1959, Ser. No. 859,670
8 Claims. (Cl. 214—505)

This invention relates to a new and useful vehicle transport, and more particularly relates to a vehicle transport which is specifically adapted for use in retrieving disabled motor vehicles. Although in many instances disabled vehicles are retrieved by the use of a crane truck, in some cases this method does not prove to be satisfactory inasmuch as the vehicle can be disabled to the extent where it is not capable of being towed when supported by any of its own wheels.

The percentage of accidents which disable motor vehicles to the extent where they may not be towed with any of their wheels engaging the ground has increased in the last several years due to the increased power built into the automobiles of today and the increased speed at which they travel over the highways. Also many motor vehicles that are equipped with automatic transmissions may not be towed for more than very short distances with their rear wheels engaging ground and it is therefore extremely difficult to handle a vehicle of this type when the front wheels thereof have been disabled. If a motor vehicle has had extensive damage to the front end thereof and it is equipped with an automatic transmission or has also had extensive damage to the rear end thereof, it is almost a necessity that the vehicle be lifted entirely from the ground while being transported to a garage.

It is therefore the main object of this invention to provide a vehicle transport which is specifically adapted to support a disabled vehicle while it is being transported to a garage in such a manner that it is not necessary for any part of the disabled vehicle to engage the road.

A further object of this invention, in accordance with the preceding object, is to provide a trailer type of vehicle which may be removably secured to a trailer hitch or the like on the rear end of a service truck or crane truck, and which is provided with a bed adapted to support disabled motor vehicles.

A still further object of this invention is to provide a means on the trailer whereby the bed thereof may be lowered to a point adjacent the road surface to facilitate the movement of a disabled vehicle into position on the trailer.

A further object of this invention, in accordance with the preceding objects, is to provide a winch on the forward portion of the trailer having a flexible member secured thereto which may be utilized to drag a totally disabled vehicle onto the vehicle supporting bed of the trailer.

A still further object of this invention is to provide a means for downwardly inclining the rear end of the trailer bed as it is lowered to a point adjacent the road surface whereby the dragging of a totally disabled vehicle thereonto and the removal of a totally disabled vehicle therefrom will be facilitated.

Another object of this invention is to provide a wheeled support means for the forward end of the trailer whereby it may be stored in an elevated position ready to be hitched to the trailer hitch on a towing vehicle.

Still another object of this invention, in accordance with the immediately preceding object, is to provide a means whereby the forward supporting means may be vertically adjusted to provide a secondary means for inclining the bed of the trailer.

A still further object of this invention is to provide an axle for the support thereof having a pair of crank arms secured to its opposite ends for journalling the supporting wheels of the trailer whereby the axle may be rotated to raise and lower the rear end of the bed of the trailer.

Yet another object of this invention is to provide a trailer having tandem axles which each are of a crank-type and which are provided with means for interconnecting the corresponding crank arms of the axles so that both may be rotated simultaneously.

Another object, in accordance with the immediately preceding object, is to provide the rearmost disposed axle with longer crank arms than the forwardly disposed axle whereby if the trailer bed is disposed substantially horizontal when in the raised position it will be downwardly inclined at its rear end when in the lowered position.

A final object to be specifically enumerated herein is to provide a device that will conform to conventional forms of manufacture, be of simple construction, and be easy to operate so as to provide a device that will be economically feasible, long lasting and operable by even the less skilled garage mechanic.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the vehicle transport;

FIGURE 2 is a side elevational view of the vehicle transport with a disabled motor vehicle shown in phantom lines positioned thereon and with the two different inclined positions being shown in phantom lines;

FIGURE 3 is an enlarged vertical longitudinal sectional view taken substantially upon the plane indicated by the section line 3—3 of FIGURE 1;

FIGURE 4 is an enlarged transverse vertical sectional view taken substantially upon the plane indicated by the section line 4—4 of FIGURE 1;

FIGURE 5 is an enlarged transverse vertical sectional view taken substantially upon the plane indicated by the section line 5—5 of FIGURE 1;

FIGURE 6 is an enlarged perspective view of part of the mechanism used to rotate the crank axle for lowering a bed of the vehicle transport;

FIGURE 7 is a top plan view of a modified form of the vehicle transport utilizing tandem axles;

FIGURE 8 is a side elevational view of the modified form of the vehicle transport;

FIGURE 9 is an enlarged longitudinal vertical sectional view taken substantially upon the plane indicated by the section line 9—9 of FIGURE 7; and FIGURE 10 is an enlarged vertical transverse sectional view taken substantially upon the plane indicated by the section line 10—10 of FIGURE 9.

Referring now more specifically to the drawings, the numeral 10 generally designates a vehicle transport comprising the instant invention. The transport 10 is provided with a frame generally designated by the reference numeral 12 which includes a forward transverse member 14 and a rear transverse member 16. The transverse members 14 and 16 are interconnected by means of a pair of side frame members which each include a generally U-shaped runway 18. Each of the runways 18 includes a pair of upstanding, parallel and spaced side flanges 20 interconnected at their bottom edges by means of a bight portion 22. The forward transverse member 14 is secured between a pair of forwardly convergent hitch support members 24 which have their rear ends secured to the forward ends of the side frame members 18 by any convenient means and have secured between their converging forward end portions a hitch element 26 and a front supporting wheel assembly generally designated by reference numeral 28. Each of the side frame members includes a rear downwardly inclined ramp portion generally designated by the reference numeral 30 having a downwardly inclined bight portion 32 and a pair of rearwardly extending and diverging upstanding flanges 34 which form continuations of the flanges 20.

A crank axle generally referred to by the reference numeral 36 has its bight portion 38 journalled for rotation about its longitudinal axis by means of a pair of journal blocks 40 which are secured beneath the side frame members in any convenient manner. Each end of the bight portion 38 is provided with a crank arm 42 which extends at right angles thereto and terminates in an outwardly directed horizontal spindle portion 44 having a support wheel 46 journalled thereon.

Secured to the bight portion 38 of the crank axle 36 is a ring gear 48 which is engaged with a worm gear 50 for effecting rotation of the bight portion 38. The worm gear 50 is journalled for rotation between the apertured end portions 52 of a yoke generally referred to by the reference numeral 54 which is provided with a bight portion 56 including a journal block 58 which rotatably receives the bight portion 38 of the axle 36. It is to be understood that any convenient means such as welding may be utilized for securing the yoke 54 to the transverse frame member 59 so that it will be held against the bight portion 38 relative to the frame 12. The rear end of a driveshaft 60 is secured to the worm gear 50 by means of a universal joint 62 and the forward end of the driveshaft 60 is secured to motor means 64 by means of a universal joint 66. It is to be noted that the motor means 64 can most conveniently be in the form of an electric motor or that it can be in the form of a crank or the like which is adapted to be hand-operated.

With attention now directed more particularly to FIGURE 2 of the drawings it will be noted that the motor means 64 may be actuated to effect rotation of the bight portion 38 of the axle 36 whereby the crank arms 42 may be rotated to position the spindles 44 above the bight portion 38 to lower the frame 12. It is to be noted that the hitch element 26 secured to the forward portion of the frame 12 may be secured to a hitch element 70 secured to the rear portion of a towing vehicle (not shown). If the hitch element 26 is secured to a hitch element 70, the forward portion of the frame 12 is maintained in its vertical relationship to the ground 72 and the rear end of the frame 12 is inclined downwardly as indicated by the phantom lines 74. Therefore, it is possible to lower the rear end of the frame 12 to a point immediately adjacent or resting upon the ground 72 while maintaining the forward portion of the frame 12 secured to the hitch element 70 of a towing vehicle.

The front support wheel assembly generally designated by the reference numeral 28 includes an internally threaded collar 76 which threadedly receives a jackscrew 78 having a handle 80 secured to its upper end for effecting rotation thereof. The lower end of the jackscrew 78 has rotatably journaled thereon a bifurcated support 82 which journals between the apertured fucations 84 thereof a forward support wheel 86. Therefore, the forward end of the frame 12 may be inclined upwardly also by disconnecting the hitch element 26 from the hitch element 70 and rotating the jackscrew 78 to lower the forward support wheel 86 relative to the frame 12. In this manner, the frame 12 may also be inclined as shown in phantom lines 88 which can be more desirable than the position shown in phantom lines 74 if the contour of the ground 72 is such that additional clearance is needed between the bight portion 38 and the ground 72 or if a greater inclination is needed to slide a disabled vehicle off the transport 10.

A transverse plate 90 is also secured between the hitch support members 24 and has secured thereto a winch mechanism generally referred to by the reference numeral 92 and includes a motor means 94 and a winch 96. The motor means 94 may be constructed in a similar manner to motor means 64.

The rear portions of the upstanding flanges 20 of each of the side frame members 18 are provided with longitudinally spaced apertures 98 for adjustably positioning each of the wheel chocks 100. The wheel chocks 100 are secured between the upstanding flanges 20 by means of threaded fasteners 102 which are secured through apertures 98. Each of the wheel chocks 100 includes a pair of triangularly shaped side walls 104 interconnected by an inclined wheel engaging wall 106 and a vertical wall 108. Thus is may be seen that the transport 10 may have a disabled vehicle 110 pulled into position thereon by means of winch 96 after the frame 12 of the transport 10 has been lowered and the rear end thereof has been inclined downwardly as shown in phantom lines 74.

After the vehicle 110 has been positioned on the transport 10, the wheel chocks 104 may be adjustably positioned on each of the side frame members 18 to embrace the lower portions of the wheels of the disabled vehicle 110 adjacent the rear of the frame 12.

With reference now more particularly to FIGS. 7 through 10 of the drawings there will be seen a modified form of the transport which is generally designated by the reference numeral 112. The transport 112 is substantially the same in construction as the transport 10 with the exception of being provided with tandem axles. Therefore, only the different structure of the transport 112 will be specifically set forth.

The forwardmost crank axle of the transport 112 is generally designated by the reference numeral 114 and includes a bight portion 116 having two crank arms 118 secured to opposite ends thereof which terminate in spindle portions 120 which are axially aligned. The spindle portions 120 are longer than the spindle portions 42 for reasons to be hereinafter set forth and the bight portion 116 is secured to the side frame members 18 by means of journal blocks 40 having a spacer block 122 disposed between the journal block 40 and the adjacent under surface of the side frame members 18. The rearmost crank axle disposed on the transport 112 is generally designated by the reference numeral 124 and includes a bight portion 126 which is provided on its opposite ends with a pair of crank arms 128 which in turn terminate in axially aligned spindle portions 130. The bight portion 126 of the crank axle 124 is journalled for rotation about its longitudinal axis by means of journal blocks 40 which may be secured directly to the undersurfaces of the side frame members 18 and it will be noted that the crank arms 28 are longer than the crank arms 18, see FIGURE 9 in particular. When the transport 112 is in the raised position the crank arms 118 and 128 are disposed vertically and extend downwardly from their respective bight portions 116 and 126. Thus, with the positioning of the spacer block 122 between the forward journal blocks on the transport 112 and the adjacent surfaces of the side frame members 18, the side frame members 18 are maintained in parallel relation to the ground 72.

The corresponding spindle portions 120 and 130 are interconnected for simultaneous and equal rotation about the bight portions 114 and 126 by means of a connecting rod generally referred to by the reference numeral 132. The connecting rods 132 are each provided with a pair of opposite end journal portions 134, one of which rotatably receives the corresponding spindle portion 120 while the other journal portion 134 rotatably receives the crank pin 136 which projects inwardly from the corresponding crank arm 128 and has a longitudinal axis spaced from the bight portion 126 a distance equal to the spacing of the longitudinal axis of the spindle portions 120 from the bight portion 116.

Therefore, it may be seen that although the bight portions 116 and 126 are rotated equally upon the actuation of motor means 64, that the rear crank axle 124 will lower the rear end of the frame 12 a greater distance than the crank axle 114 will lower the forward end of the frame 12 thereby enabling the frame to be inclined downwardly at its rear end when in the lower position to facilitate the placement of a disabled vehicle thereon while still enabling each of the support wheels 46 of the transport 112 to carry an equal portion of the load being supported by the transport 112.

It is to be understood that the flat bottom (not shown) could be used to interconnect the transverse frame members 14 and 16 if it is desired. A flat bottom rather than the runways 18 could possibly be more desirable especially if the transport is used for other purposes than carrying disabled motor vehicles such as carrying farm machinery and the like which normally when travelling on roads under its own power, moves very slowly and creates a traffic hazard.

The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle transport comprising a frame, means on said frame adapted to support a motor vehicle, a crank axle having a center bight portion and a pair of crank arms disposed on opposite ends thereof, means on said frame journaling the bight portion of said crank axle transversely of and intermediate the opposite ends of said frame for movement about its longitudinal axis, a pair of support wheels journaled on the free ends of said crank arm for movement about aligned axes parallel to said bight portion, and means for adjustably rotating said bight portion to raise or lower the rear end of said frame, a second crank axle having support wheels journaled for rotation on opposite ends thereof, said second crank axle including a pair of crank arms interconnected by means of a bight portion, means on said frame journaling said last mentioned bight portion for rotation about an axis parallel to said first mentioned bight portion, means securing said crank axles to each other for simultaneous rotation, said second crank axle being disposed rearmost on said frame, said crank arms on said second axle being longer than the other crank arms whereby said rear end of said frame will be inclined downwardly upon the housing of said frame.

2. The combination of claim 1 including a winch carried by the forward end of said frame for dragging disabled vehicles onto said frame.

3. The combination of claim 1 including a tow hitch element secured to the forward end of said frame.

4. The combination of claim 1 including a forward support wheel, means mounting said forward support wheel to a forward portion of said frame, said mounting means including means for vertically adjusting said forward support wheel.

5. The combination of claim 1 wherein said support means comprises a pair of spaced and parallel runways extending longitudinally of said frame.

6. The combination of claim 5 including at least one wheel chock for each runway, means on said runway for removably and adjustably positioning said chocks longitudinally thereof.

7. The combination of claim 6 including a forward support wheel, means mounting said forward support wheel to a forward portion of said frame, said mounting means including means for vertically adjusting said forward support wheel.

8. The combination of claim 7 including a winch carried by the forward end of said frame for dragging disabled vehicles onto said frame.

References Cited in the file of this patent

UNITED STATES PATENTS

| 1,527,901 | Munday | Feb. 24, 1925 |
| 2,462,868 | Ives | Mar. 1, 1949 |
| 2,684,021 | Ratzlaff | July 20, 1954 |
| 2,740,639 | Eckroad | Apr. 3, 1956 |

FOREIGN PATENTS

| 131,194 | Australia | Jan. 28, 1949 |
| 308,170 | Switzerland | Sept. 1, 1955 |